(12) United States Patent
Ciurea et al.

(10) Patent No.: US 7,773,257 B2
(45) Date of Patent: Aug. 10, 2010

(54) COLOR METRIC FOR HALO ARTIFACTS

(75) Inventors: Florian Ciurea, San Jose, CA (US);
Alexander Berestov, San Jose, CA (US); Tatsuya Deguchi, Kawasaki (JP);
Naoya Katoh, Ichikawa (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 741 days.

(21) Appl. No.: 11/591,662

(22) Filed: Oct. 30, 2006

(65) Prior Publication Data

US 2008/0144056 A1 Jun. 19, 2008

(51) Int. Cl.
*G06F 15/00* (2006.01)
(52) U.S. Cl. ......................... 358/1.9; 358/3.26
(58) Field of Classification Search ............... 358/1.1, 358/1.9, 3.26, 3.27, 501, 504, 518; 382/162, 382/167, 254, 266, 275
See application file for complete search history.

(56) References Cited

U.S. PATENT DOCUMENTS

| | | | | |
|---|---|---|---|---|
| 6,486,902 | B1 | 11/2002 | Spano | 347/172 |
| 6,549,303 | B1 | 4/2003 | Trask | 358/1.9 |
| 6,792,590 | B1 | 9/2004 | Pierrat et al. | 716/19 |
| 6,826,304 | B2 | 11/2004 | Levy et al. | 382/167 |
| 7,009,640 | B1 | 3/2006 | Ishii et al. | |
| 7,522,313 | B2* | 4/2009 | Dalai et al. | 358/3.26 |
| 7,522,314 | B2* | 4/2009 | Atkins | 358/3.27 |
| 2004/0017379 | A1 | 1/2004 | Ajito et al. | |

OTHER PUBLICATIONS

Roderick McDonald. J.&P. Coats Ltd., Anchor Mills Paisley, Scotland, Quality Control, "Acceptability and Perceptibility Decisions Using the CMC Color Difference Formula", vol.20 No. 6, Jun. 1988, pp. 31-37.
Edwin H. Land and John J. McCann, Polaroid Corporation, Cambridge, Massachusetts 02139, "Lightness and Retinex Theory", Jan. 1971, Journal of the Optical Society of America, vol. 61, No. 1, pp. 1-11.
Fredo Durand and Julie Dorsey, "Fast Bilateral Filtering for the Display of High-Dynamic-Range Images", pp. 257-266, Laboratory for Computer Science, Massachusetts Institute of Technology.

(Continued)

*Primary Examiner*—Thomas D Lee
(74) *Attorney, Agent, or Firm*—Haverstock & Owens LLP

(57) ABSTRACT

A method of evaluating halo artifacts is described herein. The method utilizes a pattern of color patches, a color space and color difference metrics to analyze color changes which correlate to the amount of halo. The pattern of color patches is utilized in the CIE L*a*b* color space to determine an area of patch unaffected by halo of the pattern of color patches. After the area of patch unaffected by halo is determined, a Reference Value is computed by averaging the CIE L*a*b* color for the area of patch unaffected by halo. Then an Artifact Value is calculated either by averaging the CIE L*a*b* color for the area outside the area of patch unaffected by halo but before the margin or by averaging the CIE L*a*b* color on the edge of the patch. Once these values are determined, the halo quantity is calculated.

52 Claims, 5 Drawing Sheets

OTHER PUBLICATIONS

Nathan Moroney, Local Color Correction Using Non-Linear Masking, IS&T/SID Eight Color Imaging Conference, Copyright 2000, IS&T, pp. 108-111, Hewlett-Packard Laboratories, Palo Alto, CA.

Garrett M. Johnson and Mark D. Fairchild, "Rendering HDR Images", Munsell Color Science Laboratory, Chester F. Carlson Center for Imaging Science, Rochester Institute of Technology, Rochester, NY.

William K. Pratt, "Digital Image Processing", PIKS Inside, Third Edition (Book), PixelSoft, Inc. Los Altos, CA, A Wiley-Interscience Publication, John Wiley & sons, Inc.,, Includes CD-ROM.

Buchsbaum, Gershon, "Color categories revealed by non-negative matrix factorization of Munsell color spectra", Vision Research 42 (2002) 559-563.

Acess to Munsell Spectral Database at the University of Joensuu, Finland, 2010, 6 pages.

* cited by examiner

COLOR METRIC FOR HALO ARTIFACTS

FIELD OF THE INVENTION

The present invention relates to the field of imaging. More specifically, the present invention relates to a method of evaluating halo artifacts.

BACKGROUND OF THE INVENTION

The Commission on International Eclairage (CIE) recommended the CIELUV (or CIE L*u*v*) and CIELAB (or CIE L*a*b*) color spaces and their corresponding color difference formulas in 1976. The CIE L*a*b* color space and the CIE L*a*b* color formula are widely used in color imaging applications.

The CIE L*a*b* system describes and orders colors based on the opponent theory of color vision. The opponent theory states that colors are not able to be perceived as both red and green at the same time, nor yellow and blue at the same time. However, colors are able to be perceived as combinations of: red and yellow, red and blue, green and yellow, and green and blue.

CIE L*a*b* is a color model used to describe all of the colors visible to the human eye. The first of the three parameters in the model represents the luminance or lightness, L*, of the color wherein L*=0 indicates black and L*=100 indicates white. The position between red and green is indicated by a* wherein negative values indicate green and positive values indicate red. The position between blue and yellow is indicated by b* wherein negative values indicate blue and positive values indicate yellow.

CIE L*a*b* color difference, between any two colors in CIE 1976 color space, is the distance between the color locations. This distance is typically expressed as ΔE, where:

$$\Delta E = \sqrt{(\Delta L^*)^2 + (\Delta a^*)^2 + (\Delta b^*)^2}$$

The chroma and hue angle are computed from the CIE L*a*b* space by the formula:

$$C = \sqrt{a^{*2} + b^{*2}}$$

$$h = \arctan(b^*/a^*)$$

While the color difference formula is widely used, its chroma scale is known to be fairly nonlinear.

In 1994, CIE recommended an updated color difference formula named CIE 94, which is calculated from $\Delta L^*_{ab}$, $\Delta C^*_{ab}$ and $\Delta H^*_{ab}$:

$$\Delta E_{94} = \sqrt{\left(\frac{\Delta L^*}{k_l \cdot S_l}\right)^2 + \left(\frac{\Delta C^*}{k_c \cdot S_c}\right)^2 + \left(\frac{\Delta H^*}{k_h \cdot S_h}\right)^2}$$

where $S_l=1$, $S_c=1+0.045\ C^*$, $S_h=1+0.015\ C^*$ $k_l$, $k_c$ and $k_h$ are numeric parametric factors that permit the independent weighting of lightness ($\Delta L^*_{ab}$), chroma ($\Delta C^*_{ab}$) and hue ($\Delta H^*_{ab}$) differences. Values selected for the parametric factors are shown in the naming convention CIE94 ($k_l$:$k_c$:$k_h$).

Another formula, the CMC Color difference formula is mainly used in the textile industry:

$$\Delta E_{CMC} = \sqrt{\left(\frac{\Delta L^*}{l \cdot S_l}\right)^2 + \left(\frac{\Delta C^*}{c \cdot S_c}\right)^2 + \left(\frac{\Delta H^*}{S_h}\right)^2}$$

$S_l$, $S_c$ and $S_h$ are CMC weighting functions that adjust the CIE differences ($\Delta L^*_{ab}$, $\Delta C^*_{ab}$ and $\Delta H^*_{ab}$) depending upon the location of the standard in CIE L*a*b* 1976 color space.

A user of the CMC formula usually sets values for l and c parameters according to practice in the industry. The numeric parametric factors, l and c, permit the independent weighting of lightness ($\Delta L^*_{ab}$) and chroma ($\Delta C^*_{ab}$) differences, relative to the hue ($\Delta H^*_{ab}$) difference. Current practice is that c is set to 1 for all industries. And l is set to 2 for textiles and to about 1.4 for paint and plastics applications.

There are a number of image processing operations that are subject to halo artifacts across the edges. Halo artifacts are characterized by overestimation ("overshoot") on one side of the edge and underestimation ("undershoot") on the other side of the edge. FIG. 6A illustrates an unprocessed image, while FIG. 6B illustrates a halo artifact in the processed image. Most common image processing methods that generate halo artifacts are high dynamic range compression methods which rely on Gaussian style blurring, for example retinex, local color correction and iCam. Other common methods that generate halo artifacts are edge enhancement methods which include unsharp masking and Wallis Filter [statistical differencing].

SUMMARY OF THE INVENTION

A method of evaluating halo artifacts is described herein. The method utilizes a pattern of color patches, a color space and color difference metrics to analyze color changes which correlate to the amount of halo. The pattern of color patches is utilized in the CIE L*a*b* color space to determine an area of patch unaffected by halo of the pattern of color patches. After the area of patch unaffected by halo is determined, a Reference Value is computed by averaging the CIE L*a*b* color for the area of patch unaffected by halo. Then an Artifact Value is calculated either by averaging the CIE L*a*b* color for the area outside the area of patch unaffected by halo but before the margin or by averaging the CIE L*a*b* color on the edge of the patch. Once these values are determined, the halo quantity is calculated.

In one aspect, a method of calculating a halo quantity comprises analyzing a pattern of color patches, determining an area of patch unaffected by halo within the pattern of color patches, determining a reference value using the area of patch unaffected by halo, determining an artifact value and calculating the halo quantity using the reference value and the artifact value. Analyzing occurs in CIE L*a*b* color space. Determining the area of patch unaffected by halo is related to a size of filter generating halo artifacts. Determining the area of patch unaffected by halo further comprises choosing a pixel location on a patch margin, locating a plurality of pixels from the patch margin to the patch interior in the direction perpendicular to the patch margin, computing a gradient across the plurality of pixels and noting a pixel location where the absolute value of the gradient falls below a predetermined threshold. The reference value is the average CIE L*a*b* color for the area of patch unaffected by halo. The artifact value is the average CIE L*a*b* color for an outside area between a margin surrounding the patch and the area of patch unaffected by halo. Alternatively, the artifact value is the average CIE L*a*b* color on the edge of the patch. The halo quantity is utilized for quantifying artifacts due to an image processing operation from the group consisting of high dynamic range compression, edge enhancement, video coding and image compression. The pattern of color patches is a ColorChecker.

In another aspect, a method of calculating a halo quantity comprises analyzing a pattern of color patches in CIE L*a*b* color space, determining an area of patch unaffected by halo within the pattern of color patches, determining a reference value using the area of patch unaffected by halo, wherein the reference value is the average CIE L*a*b* color for the area of patch unaffected by halo, determining an artifact value using an outer area of the patch and calculating the halo quantity using the reference value and the artifact value. Determining the area of patch unaffected by halo is related to a size of filter generating halo artifacts. Determining the area of patch unaffected by halo further comprises choosing a pixel location on a patch margin, locating a plurality of pixels from the patch margin to the patch interior in the direction perpendicular to the patch margin, computing a gradient across the plurality of pixels and noting a pixel location where the absolute value of the gradient falls below a predetermined threshold. The artifact value is the average CIE L*a*b* color for the outside area between a margin surrounding the patch and the area of patch unaffected by halo. Alternatively, the artifact value is the average CIE L*a*b* color on the edge of the patch. The halo quantity is utilized for quantifying artifacts due to an image processing operation from the group consisting of high dynamic range compression, edge enhancement, video coding and image compression. The pattern of color patches is a ColorChecker.

In yet another aspect, a method of determining an area of patch unaffected by halo within a pattern of color patches comprises choosing a pixel location on a patch margin, locating a plurality of pixels from the patch margin to the patch interior in the direction perpendicular to the patch margin, computing a gradient across the plurality of pixels and noting a pixel location where the absolute value of the gradient falls below a predetermined threshold. The method further comprises blurring an image appropriately to minimize the influence of noise in the image. The pattern of color patches is a ColorChecker.

In another aspect, a system for determining a halo quantity comprises a pattern of color patches and a program for determining an area of patch unaffected by halo within the pattern of color patches, determining a reference value using the area of patch unaffected by halo, determining an artifact value and calculating the halo quantity using the reference value and the artifact value. The pattern of color patches is used in CIE L*a*b* color space. The pattern of color patches is a ColorChecker. The program determines the area of patch unaffected by halo based on a size of filter generating halo artifacts. Alternatively, the program determines the area of patch unaffected by halo by choosing a pixel location on the patch margin, locating a plurality of pixels from the patch margin to the patch interior in the direction perpendicular to the patch margin, computing a gradient across the plurality of pixels and noting the pixel location where the absolute value of the gradient falls below a threshold. The reference value is the average CIE L*a*b* color for the area of patch unaffected by halo. The artifact value is the average CIE L*a*b* color for an outside area between a margin surrounding the patch and the area of patch unaffected by halo. Alternatively, the artifact value is the average CIE L*a*b* color on the edge of the patch. The halo quantity is utilized for quantifying artifacts due to an image processing operation from the group consist-ing of high dynamic range compression, edge enhancement, video coding and image compression.

In yet another aspect, an image output testing device comprises a mechanism for receiving an image, wherein the image is of a pattern of color patches and a program for determining an area of patch unaffected by halo within the pattern of color patches, determining a reference value using the area of patch unaffected by halo, determining an artifact value and calculating the halo quantity using the reference value and the artifact value. The image output testing device is selected from the group consisting of a camera and a camcorder. The mechanism comprises internal components of a camera device. Alternatively, the mechanism is a network interface for receiving the image from a network. Alternatively, the mechanism is selected from the group consisting of a universal serial bus port, a Firewire port and a Bluetooth port. The pattern of color patches is used in CIE L*a*b* color space. The pattern of color patches is a ColorChecker. The program determines the area of patch unaffected by halo based on a size of filter generating halo artifacts. Alternatively, the program determines the area of patch unaffected by halo by choosing a pixel location on the patch margin, locating a plurality of pixels from the patch margin to the patch interior in the direction perpendicular to the patch margin, computing a gradient across the plurality of pixels and noting the pixel location where the absolute value of the gradient falls below a threshold. The reference value is the average CIE L*a*b* color for the area of patch unaffected by halo. The artifact value is the average CIE L*a*b* color for an outside area between a margin surrounding the patch and the area of patch unaffected by halo. Alternatively, the artifact value is the average CIE L*a*b* color on the edge of the patch. The halo quantity is utilized for quantifying artifacts due to an image processing operation selected from the group consisting of high dynamic range compression, edge enhancement, video coding and image compression.

DETAILED DESCRIPTION OF THE PREFERRED EMBODIMENT

Although the existence of halo artifacts is known, there is no method to quantify the appearance of halo artifacts in image processing operations. Thus, there is a need quantitatively evaluate halo artifacts in imaging applications.

Figure 1:
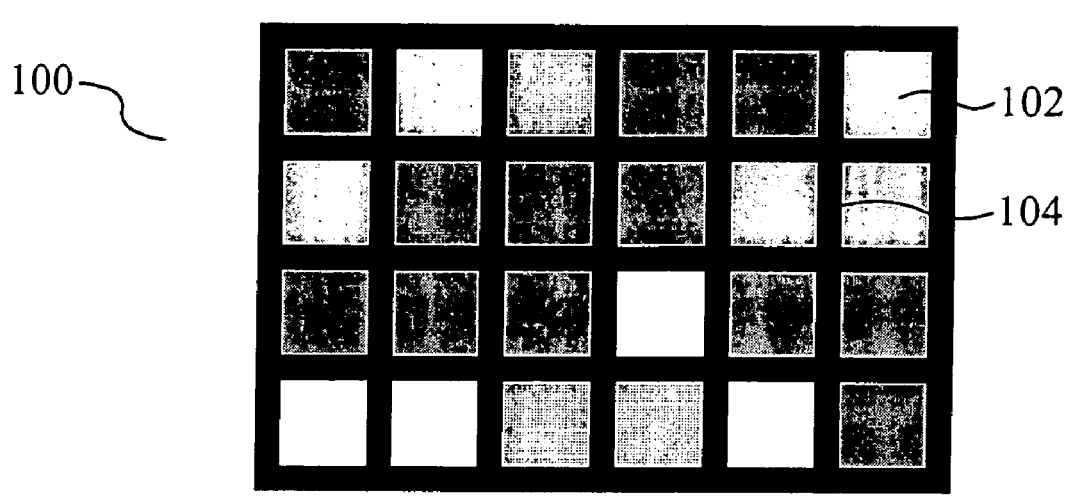
FIG. 1 illustrates a pattern of color patches.

A pattern of color patches 100, illustrated in FIG. 1, is a checkerboard array of scientifically prepared color squares also known as patches 102 in a wide range of colors. Around each of the patches 102 is a margin 104. Many of the patches 102 represent natural objects of special interest, such as human skin, foliage and blue sky. The patches 102 are not only the same color as their counterparts, but also reflect light the same way in all parts of the visible spectrum. Furthermore, because of this unique feature, the patches 102 match the colors of natural objects under any illumination and with any color reproduction process. The bottom row of the chart has four very different shades of gray between a white square and a black one. The gray scale on the bottom row indicates when a photo is under-exposed or over-exposed. In some embodiments, a Macbeth™ ColorChecker 100 is used for color evaluation, typically in CIE L*a*b* color space. Often the ΔE metric described above is used with the Macbeth™ ColorChecker 100. Very often, image processing operations are performed in RGB or a color space other than the perceptually uniform Lab. In these cases, to utilize the present invention the images are converted to the CIE L*a*b* color space using known methods.

Figure 2:
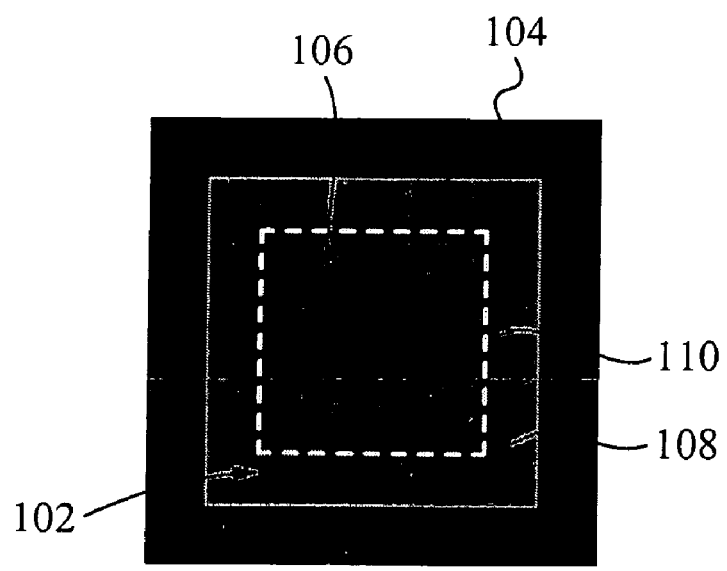
FIG. 2 illustrates how a pattern of color patches is utilized to determine a halo quantity.

FIG. 2 illustrates how the pattern of color patches is utilized to determine a halo quantity. Using the pattern of color patches, edges are formed between the patches 102 and the margins 104. The color changes across the patches 102 are then analyzed using the ΔE color difference metric.

The analysis is performed in several different variations, which all share a common framework: identifying an area of patch unaffected by halo 106 inside the patch 102 within a dotted box 110 that is of approximately uniform color and then comparing an outer area 108 which is the color of the rest of the patch 102 outside the dotted box 110 with this approximately uniform area 106. A Reference Value is the average CIE L*a*b* color for the area of patch unaffected by halo 106. In one method, an Artifact Value is the average CIE L*a*b* color for the outer area 108 between the dotted box 110 and the margin 104. In another method, the Artifact Value is the average CIE L*a*b* color on the edge of the patch 102. Using the Reference Value and the Artifact Value the Halo is able to then be determined. The Halo metric is:

ΔHalo=ΔE(Reference-L*a*b*, Artifact-L*a*b*)

If, for example, a value of ΔHalo=5.10 is obtained, then in the CIE L*a*b* color space, this represents about 5 just noticeable differences in the patch color.

As described above, the Reference Value is the average CIE L*a*b* color for the area of patch unaffected by halo 106. Hence, the area of patch unaffected by halo 106 must be established before a Reference Value is able to be determined. The size of the area of patch unaffected by halo 106 is able to be ascertained in a number of ways. One method utilizes predetermined information and is based on a priori knowledge about a size of filter generating halo artifacts used in an image processing method yielding the halo artifact. For example, if a size of filter generating halo artifacts is 7 pixels, then the area of patch unaffected by halo 106 is set at 7 pixels inside the patch margin 104. Another method, which utilizes variable information, automatically detects the area of patch unaffected by halo 106 from the halo area.

Figure 3:
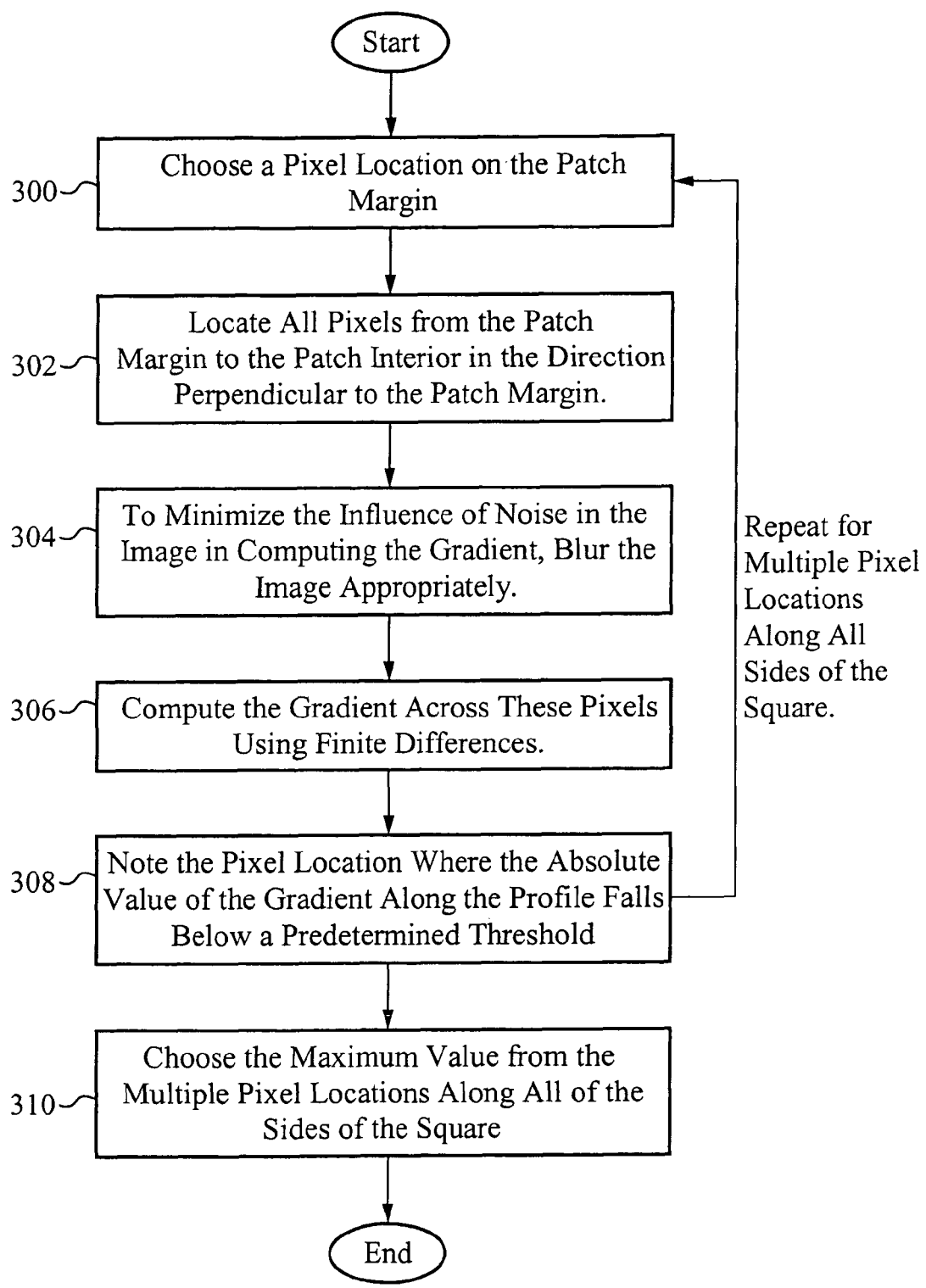
FIG. 3 illustrates a flow chart of a method for estimating filter size.

FIG. 3 illustrates a flow chart of the method for estimating filter size. In the step 300, a pixel location is chosen on the patch margin. Then in the step 302, all pixels from the patch margin to the patch interior in the direction perpendicular to the patch margin are located. To minimize the influence of noise in the image in computing the gradient, the image is blurred appropriately, in the step 304. In the step 306, the gradient across the pixels is computed using finite differences. In the step 308, the pixel location is noted where the absolute value of the gradient along the profile falls below a predetermined threshold. This is when the area of approximately uniform color in the patch is reached. The steps 300 through 308 are repeated for multiple pixel locations along all sides of the square, and then a maximum value is chosen in the step 310. Thus, the border area of the approximately uniform color in the patch is computed. The border area of the approximately uniform color is represented by the dotted box 110 (FIG. 2).

Figure 4:
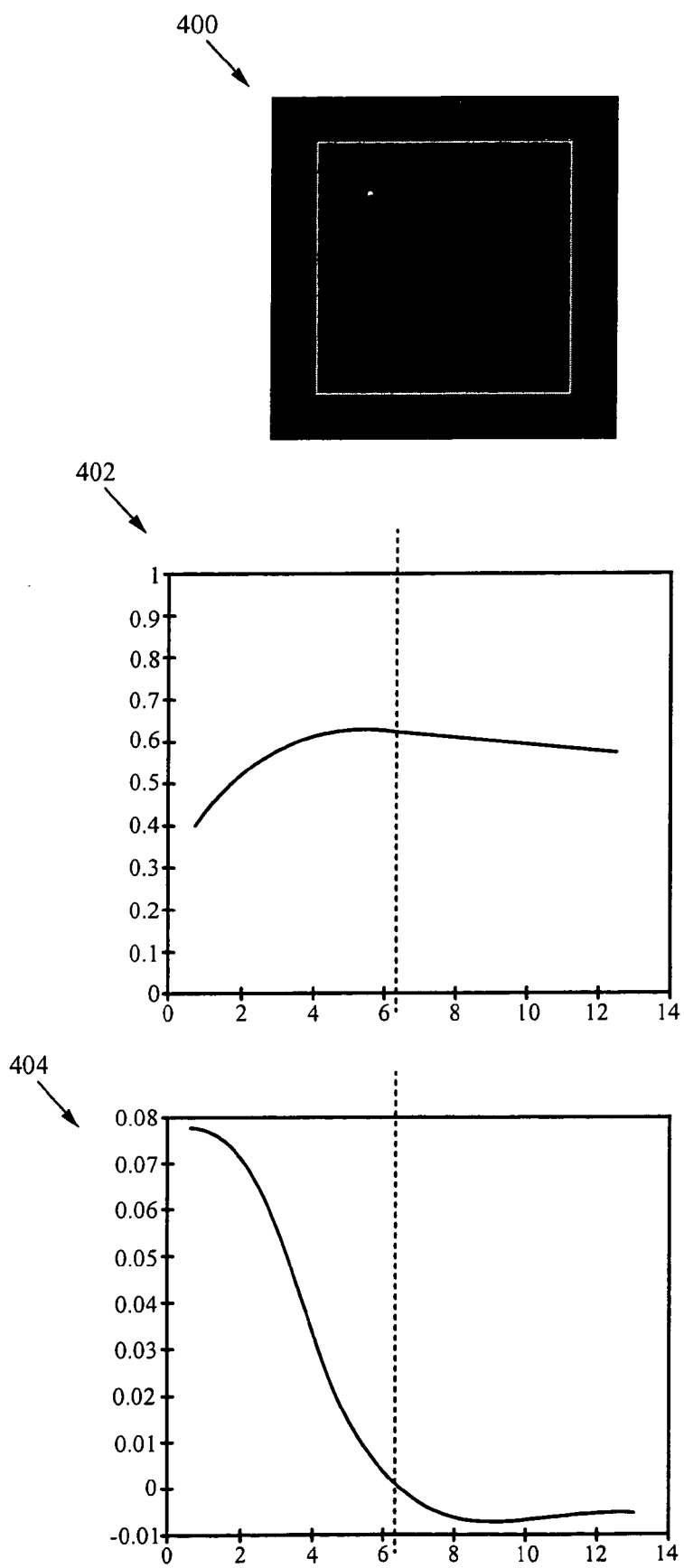
FIG. 4 illustrates exemplary computations using a method for estimating filter size.

FIG. 4 illustrates exemplary computations using the method for estimating filter size. The patch 400 with halo artifacts to be evaluated is shown on the top. A graph 402 of the profile of the section including the halo is shown in the middle. On the bottom is the profile of the gradient across the section, in graph 404. In the example, at around 6 to 7 pixels, the profile of the values become constant in the graph 402 as shown by the vertical dotted line. This is also reflected in the gradient values, where the gradient becomes zero, as seen in graph 404, also at around 6 to 7 pixels. The dotted line represents the size of the inner box 106 (FIG. 2).

Figure 5:
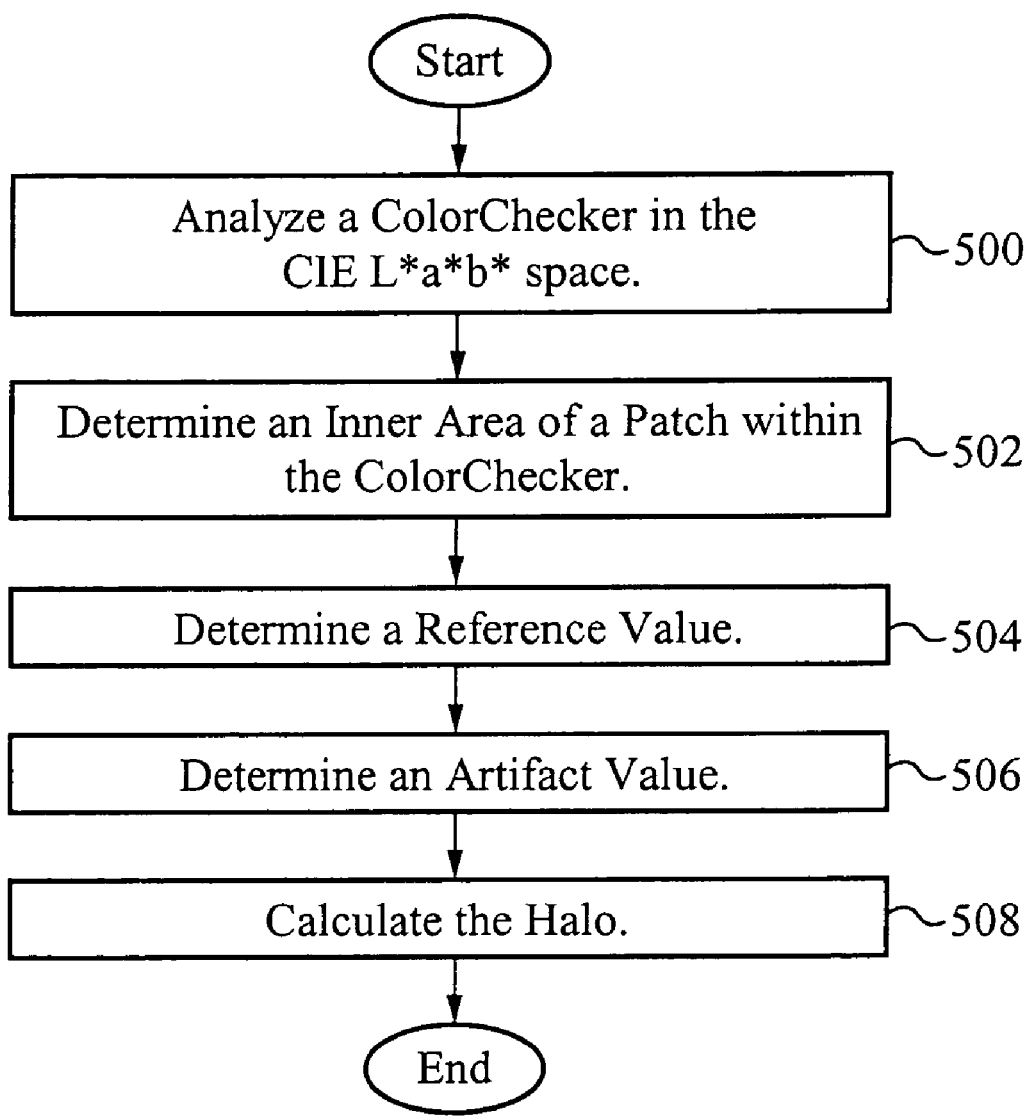
FIG. 5 illustrates a flow chart of the overall method of determining halo artifacts.
Figure 6A:
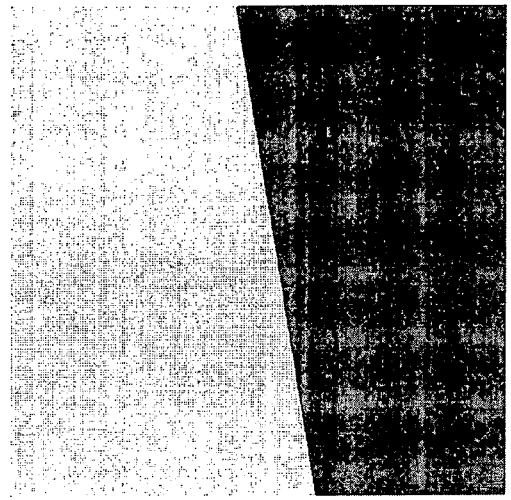
FIG. 6A illustrates an unprocessed image.
Figure 6B:
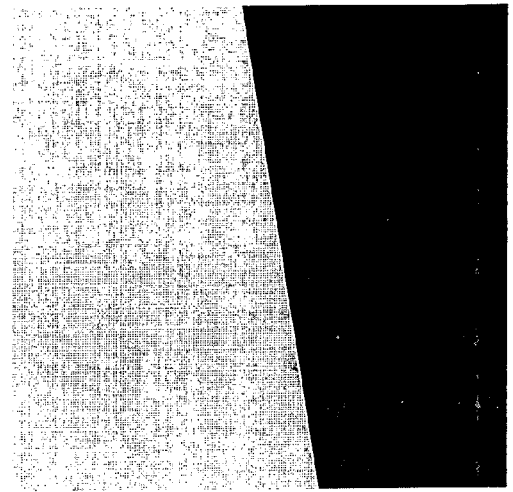
FIG. 6B illustrates a halo artifact in the processed image.

FIG. 5 illustrates a flowchart of the overall method of determining halo artifacts. In the step 500, the pattern of color patches is analyzed in the CIE L*a*b* color space. Analysis includes taking/receiving data corresponding to the pattern of color patches lightness, chroma and hue. In particular one or more patches with their surrounding borders of the pattern of color patches are used. Then in the step 502, the area of patch unaffected by halo is determined. There are multiple ways of determining the area of patch unaffected by halo, but two specific ways include "predetermined" and "variable" as described above. In the step 504, the Reference Value is determined which is the average CIE L*a*b* color for the area of patch unaffected by halo. In the step 506, the Artifact Value is determined. One method of determining the Artifact Value includes averaging the CIE L*a*b* color of the area 108 between the border of the area of patch unaffected by halo (dotted box in FIG. 2) and the margin 104 (FIG. 2). Another way of determining the Artifact Value is averaging the CIE L*a*b* color on the edge of the patch 102 (FIG. 2). In the step 508, the halo quantity is calculated using the information gathered from the steps 500 through 506. Determining the halo quantity is computed using the L*a*b* difference error metrics.

An alternative metric is also able to be used to characterize the halo appearance, based on the CIE lightness (L*), CIE chroma (C*) and CIE hue (H), using different weights for the separate differences: ΔL*, ΔC* and ΔH*.

Similar to the definition of $\Delta E_{94}$, the halo metric is able to be defined as:

$$\Delta Halo = \sqrt{\left(\frac{\Delta L^*}{w_L}\right)^2 + \left(\frac{\Delta C^*}{w_c}\right)^2 + \left(\frac{\Delta H^*}{w_H}\right)^2}$$

or $$\Delta Halo = \sqrt{(w_L \cdot \Delta L^*)^2 + (w_c \cdot \Delta C^*)^2 + (w_H \cdot \Delta H^*)^2}$$

The weights $w_L$, $w_C$ and $w_H$ are able to take any value and are able to be set following psychophysical experiments for validation of the halo metric. Appropriate values of the weights are able to increase or decrease (to zero) the relative importance of lightness, chroma and hue difference in the halo metric.

The methods described herein are applicable to high dynamic range compression, edge enhancement, video coding, image compression and many other fields of imaging.

To utilize the method of determining halo artifacts, one must first acquire a pattern of color patches. The pattern of color patches is then utilized in the CIE L*a*b* color space to determine an area of patch unaffected by halo of the pattern of color patches. The area of patch unaffected by halo is able to be predetermined based on knowledge of the size of filter generating halo artifacts used in the image processing method yielding the halo artifact. Alternatively, the area of patch unaffected by halo is determined by automatically detecting the area of patch unaffected by halo by choosing a pixel location on the patch margin, locating all pixels from the patch margin to the patch interior in the direction perpendicular to the patch margin, computing the gradient across these pixels using finite differences and noting the pixel location where the absolute value of the gradient along the profile falls below a predetermined threshold. The steps for determining the area of patch unaffected by halo are repeated along all sides of the square, and a maximum value is chosen which gives the border of the area of patch unaffected by halo. After the area of patch unaffected by halo is determined, a Reference Value is computed by averaging the CIE L*a*b* color for the area of patch unaffected by halo. Then an Artifact Value is calculated either by averaging the CIE L*a*b* color for the area outside the area of patch unaffected by halo but before the margin or by averaging the CIE L*a*b* color on the edge of the patch. Once all of these values are determined, the halo quantity is calculated.

In operation, knowing the halo quantity is useful for correcting the attributes that cause the halo effect. For example, cameras and printers which suffer from halos are able to identify the halo effect and implement a mechanism that counteracts the halo and results in a clearer image, free of halo artifacts.

In other embodiments, a pattern of color patches other than the Macbeth™ ColorChecker is used.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of calculating a halo quantity, comprising:
   a. analyzing a pattern of color patches received by a device;
   b. determining an area of a patch unaffected by halo within the pattern of color patches;
   c. determining a reference value using the area of the patch unaffected by halo, wherein the area of the patch unaffected by halo is related to a size of filter generating halo artifacts;
   d. determining an artifact value; and
   e. calculating the halo quantity using the reference value and the artifact value, wherein determining the area, determining the reference value, determining the artifact value, and calculating the halo quantity are performed by a program stored within a memory in the device.

2. The method as claimed in claim 1 wherein analyzing occurs in CIE L*a*b* color space.

3. The method as claimed in claim 1 wherein the reference value is the average CIE L*a*b* color for the area of the patch unaffected by halo.

4. The method as claimed in claim 1 wherein the artifact value is the average CIE L*a*b* color for an outside area between a margin surrounding the patch and the area of the patch unaffected by halo.

5. The method as claimed in claim 1 wherein the artifact value is the average CIE L*a*b* color on the edge of the patch.

6. The method as claimed in claim 1 wherein the halo quantity is utilized for quantifying artifacts due to an image processing operation selected from the group consisting of high dynamic range compression, edge enhancement, video coding and image compression.

7. The method as claimed in claim 1 wherein the pattern of color patches is a ColorChecker.

8. A method of calculating a halo quantity, comprising:
   a. analyzing a pattern of color patches received by a device;
   b. determining an area of a patch unaffected by halo within the pattern of color patches by
      i. choosing a pixel location on a patch margin;
      ii. locating a plurality of pixels from the patch margin to the patch interior in the direction perpendicular to the patch margin;
      iii. computing a gradient across the plurality of pixels; and
      iv. noting a pixel location where the absolute value of the gradient falls below a predetermined threshold;
   c. determining a reference value using the area of the patch unaffected by halo;
   d. determining an artifact value; and
   e. calculating the halo quantity using the reference value and the artifact value, wherein determining the area, determining the reference value, determining the artifact value, and calculating the halo quantity are performed by a program stored within a memory in the device.

9. The method as claimed in claim 8 wherein the reference value is the average CIE L*a*b* color for the area of the patch unaffected by halo.

10. The method as claimed in claim 8 wherein the artifact value is the average CIE L*a*b* color for an outside area between a margin surrounding the patch and the area of the patch unaffected by halo.

11. The method as claimed in claim 8 wherein the artifact value is the average CIE L*a*b* color on the edge of the patch.

12. The method as claimed in claim 8 wherein the halo quantity is utilized for quantifying artifacts due to an image processing operation selected from the group consisting of high dynamic range compression, edge enhancement, video coding and image compression.

13. The method as claimed in claim 8 wherein the pattern of color patches is a ColorChecker.

14. A method of calculating a halo quantity, comprising:
   a. analyzing a pattern of color patches in CIE L*a*b* color space, the pattern of color patches received by a device;
   b. determining an area of a patch unaffected by halo within the pattern of color patches;
   c. determining a reference value using the area of the patch unaffected by halo, wherein the reference value is the average CIE L*a*b* color for the area of the patch unaffected by halo;
   d. determining an artifact value using an outer area of the patch, wherein the artifact value comprises an average of a plurality of artifact sub-values; and
   e. calculating the halo quantity using the reference value and the artifact value, wherein determining the area, determining the reference value, determining the artifact value, and calculating the halo quantity are performed by a program stored within a memory in the device.

15. The method as claimed in claim 14 wherein the artifact value is the average CIE L*a*b* color for the outside area between a margin surrounding the patch and the area of the patch unaffected by halo.

16. The method as claimed in claim 14 wherein the artifact value is the average CIE L*a*b* color on the edge of the patch.

17. The method as claimed in claim 14 wherein the halo quantity is utilized for quantifying artifacts due to an image processing operation selected from the group consisting of high dynamic range compression, edge enhancement, video coding and image compression.

18. The method as claimed in claim 14 wherein the pattern of color patches is a ColorChecker.

19. A method of calculating a halo quantity, comprising:
   a. analyzing a pattern of color patches in CIE L*a*b* color space, the pattern of color patches received by a device;
   b. determining an area of a patch unaffected by halo within the pattern of color patches;
   c. determining a reference value using the area of the patch unaffected by halo, wherein the reference value is the average CIE L*a*b* color for the area of the patch unaffected by halo, wherein determining the area of the patch unaffected by halo is related to a size of filter generating halo artifacts;
   d. determining an artifact value using an outer area of the patch, wherein the artifact value comprises an average of a plurality of artifact sub-values; and
   e. calculating the halo quantity using the reference value and the artifact value, wherein determining the area, determining the reference value, determining the artifact value, and calculating the halo quantity are performed by a program stored within a memory in the device.

20. The method as claimed in claim 14 wherein determining the area of the patch unaffected by halo further comprises:
   a. choosing a pixel location on a patch margin;
   b. locating a plurality of pixels from the patch margin to the patch interior in the direction perpendicular to the patch margin;
   c. computing a gradient across the plurality of pixels; and
   d. noting a pixel location where the absolute value of the gradient falls below a predetermined threshold.

21. A method of determining an area of a patch unaffected by halo within a pattern of color patches comprising:
   a. receiving the pattern of color patches by a device;
   b. choosing a pixel location on a patch margin;
   c. locating a plurality of pixels from the patch margin to the patch interior in the direction perpendicular to the patch margin;
   d. computing a gradient across the plurality of pixels; and
   e. noting a pixel location where the absolute value of the gradient falls below a predetermined threshold, wherein choosing the pixel location, locating the plurality of pixels, computing the gradient, and noting the pixel location are performed by a program stored within a memory in the device.

22. The method as claimed in claim 21 further comprising blurring an image appropriately to minimize the influence of noise in the image.

23. The method as claimed in claim 21 wherein the pattern of color patches is a ColorChecker.

24. A system for determining a halo quantity, comprising:
   a. a mechanism for receiving a pattern of color patches; and
   b. a program for
      i. determining an area of a patch unaffected by halo within the pattern of color patches, wherein the program determines the area of the patch unaffected by halo based on a size of filter generating halo artifacts;
      ii. determining a reference value using the area of the patch unaffected by halo;
      iii. determining an artifact value; and
      iv. calculating the halo quantity using the reference value and the artifact value.

25. The system as claimed in claim 24 wherein the pattern of color patches is used in CIE L*a*b* color space.

26. The system as claimed in claim 24 wherein the pattern of color patches is a ColorChecker.

27. A system for determining a halo quantity, comprising:
   a. a mechanism for receiving a pattern of color patches; and
   b. a program for
      i. determining an area of a patch unaffected by halo within the pattern of color patches by
         (1) choosing a pixel location on the patch margin;
         (2) locating a plurality of pixels from the patch margin to the patch interior in the direction perpendicular to the patch margin;
         (3) computing a gradient across the plurality of pixels; and
         (4) noting the pixel location where the absolute value of the gradient falls below a threshold;
      ii. determining a reference value using the area of the patch unaffected by halo;
      iii. determining an artifact value; and
      iv. calculating the halo quantity using the reference value and the artifact value.

28. The system as claimed in claim 24 wherein the reference value is the average CIE L*a*b* color for the area of the patch unaffected by halo.

29. The system as claimed in claim 24 wherein the artifact value is the average CIE L*a*b* color for an outside area between a margin surrounding the patch and the area of the patch unaffected by halo.

30. The system as claimed in claim 24 wherein the artifact value is the average CIE L*a*b* color on the edge of the patch.

31. The system as claimed in claim 24 wherein the halo quantity is utilized for quantifying artifacts due to an image processing operation selected from the group consisting of high dynamic range compression, edge enhancement, video coding and image compression.

32. An image output testing device comprising:
   a. a mechanism for receiving an image, wherein the image is of a pattern of color patches; and
   b. a program for
      i. determining an area of a patch unaffected by halo within the pattern of color patches, wherein the program determines the area of the patch unaffected by halo based on a size of filter generating halo artifacts;
      ii. determining a reference value using the area of the patch unaffected by halo;
      iii. determining an artifact value; and
      iv. calculating the halo quantity using the reference value and the artifact value.

33. The image output testing device as claimed in claim 32 wherein the image output testing device is selected from the group consisting of a camera and a camcorder.

34. The image output testing device as claimed in claim 32 wherein the mechanism comprises internal components of a camera device.

35. The image output testing device as claimed in claim 32 wherein the mechanism is a network interface for receiving the image from a network.

36. The image output testing device as claimed in claim 32 wherein the mechanism is selected from the group consisting of a universal serial bus port, a Firewire port and a Bluetooth port.

37. The image output testing device as claimed in claim 32 wherein the pattern of color patches is used in CIE L*a*b* color space.

38. The image output testing device as claimed in claim 32 wherein the pattern of color patches is a ColorChecker.

39. The image output testing device as claimed in claim 32 wherein the reference value is the average CIE L*a*b* color for the area of the patch unaffected by halo.

40. The image output testing device as claimed in claim 32 wherein the artifact value is the average CIE L*a*b* color for an outside area between a margin surrounding the patch and the area of the patch unaffected by halo.

41. The image output testing device as claimed in claim 32 wherein the artifact value is the average CIE L*a*b* color on the edge of the patch.

42. The image output testing device as claimed in claim 32 wherein the halo quantity is utilized for quantifying artifacts due to an image processing operation selected from the group consisting of high dynamic range compression, edge enhancement, video coding and image compression.

43. An image output testing device comprising:
  a. a mechanism for receiving an image, wherein the image is of a pattern of color patches; and
  b. a program for
    i. determining an area of a patch unaffected by halo within the pattern of color patches by
      (1) choosing a pixel location on the patch margin;
      (2) locating a plurality of pixels from the patch margin to the patch interior in the direction perpendicular to the patch margin;
      (3) computing a gradient across the plurality of pixels; and
      (4) noting the pixel location where the absolute value of the gradient falls below a threshold;
    ii. determining a reference value using the area of the patch unaffected by halo;
    iii. determining an artifact value; and
    iv. calculating the halo quantity using the reference value and the artifact value.

44. A method of calculating a halo quantity, comprising:
  a. analyzing a pattern of color patches received by a device;
  b. determining an area of a patch unaffected by halo within the pattern of color patches;
  c. determining a reference value using the area of the patch unaffected by halo;
  d. determining an artifact value, wherein the artifact value comprises an average of a plurality of artifact sub-values; and
  e. calculating the halo quantity using the reference value and the artifact value, wherein determining the area, determining the reference value, determining the artifact value, and calculating the halo quantity are performed by a program stored within a memory in the device.

45. The method as claimed in claim 44 wherein analyzing occurs in CIE L*a*b* color space.

46. The method as claimed in claim 44 wherein determining the area of the patch unaffected by halo further comprises:
  a. choosing a pixel location on a patch margin;
  b. locating a plurality of pixels from the patch margin to the patch interior in the direction perpendicular to the patch margin;
  c. computing a gradient across the plurality of pixels; and
  d. noting a pixel location where the absolute value of the gradient falls below a predetermined threshold.

47. The method as claimed in claim 44 wherein the reference value is the average CIE L*a*b* color for the area of the patch unaffected by halo.

48. The method as claimed in claim 44 wherein the artifact value is the average CIE L*a*b* color for an outside area between a margin surrounding the patch and the area of the patch unaffected by halo.

49. The method as claimed in claim 44 wherein the artifact value is the average CIE L*a*b* color on the edge of the patch.

50. The method as claimed in claim 44 wherein the halo quantity is utilized for quantifying artifacts due to an image processing operation selected from the group consisting of high dynamic range compression, edge enhancement, video coding and image compression.

51. The method as claimed in claim 44 wherein the pattern of color patches is a ColorChecker.

52. A method of calculating a halo quantity, comprising:
  a. analyzing a pattern of color patches received by a device;
  b. determining an area of a patch unaffected by halo within the pattern of color patches;
  c. determining a reference value using the area of the patch unaffected by halo, wherein determining the area of the patch unaffected by halo is related to a size of filter generating halo artifacts;
  d. determining an artifact value, wherein the artifact value comprises an average of a plurality of artifact sub-values; and
  e. calculating the halo quantity using the reference value and the artifact value, wherein determining the area, determining the reference value, determining the artifact value, and calculating the halo quantity are performed by a program stored within a memory in the device.

* * * * *

UNITED STATES PATENT AND TRADEMARK OFFICE
CERTIFICATE OF CORRECTION

PATENT NO. : 7,773,257 B2  
APPLICATION NO. : 11/591662  
DATED : August 10, 2010  
INVENTOR(S) : Florian Ciurea et al.

It is certified that error appears in the above-identified patent and that said Letters Patent is hereby corrected as shown below:

Title Page

At the references cited (56), "7522313 B2*" reference, please replace "Dalai et al." with "Dalal et al."

Signed and Sealed this
Twenty-fifth Day of January, 2011

David J. Kappos
*Director of the United States Patent and Trademark Office*